(12) United States Patent
Imai

(10) Patent No.: US 9,182,595 B2
(45) Date of Patent: Nov. 10, 2015

(54) IMAGE DISPLAY DEVICES

(75) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 14/122,612

(22) PCT Filed: May 31, 2012

(86) PCT No.: PCT/JP2012/064148
§ 371 (c)(1),
(2), (4) Date: Jan. 28, 2014

(87) PCT Pub. No.: WO2012/165575
PCT Pub. Date: Dec. 6, 2012

(65) Prior Publication Data
US 2014/0153072 A1    Jun. 5, 2014

(30) Foreign Application Priority Data
Jun. 2, 2011   (JP) .................................. 2011-124331

(51) Int. Cl.
*G02B 26/08*   (2006.01)
*G02B 26/10*   (2006.01)
*G02B 15/00*   (2006.01)
*G02B 17/02*   (2006.01)

(52) U.S. Cl.
CPC ................ *G02B 26/10* (2013.01); *G02B 15/00* (2013.01); *G02B 17/023* (2013.01); *G02B 26/101* (2013.01)

(58) Field of Classification Search
USPC .................... 359/204, 212, 216, 201.2, 212.1
See application file for complete search history.

(56) References Cited

U.S. PATENT DOCUMENTS

| 5,561,544 A | 10/1996 | Macken |
| 6,175,440 B1 * | 1/2001 | Conemac .................... 359/204.1 |
| RE38,165 E | 7/2003 | Macken |
| 7,098,871 B1 * | 8/2006 | Tegreene et al. .................. 345/7 |

FOREIGN PATENT DOCUMENTS

| DE | 69636668 | 9/2007 |
| JP | 11-501738 | 2/1999 |
| JP | 2000-171742 | 6/2000 |
| JP | 2007-121538 | 5/2007 |
| JP | 2008-268645 | 11/2008 |
| WO | WO-96/27814 | 9/1996 |

OTHER PUBLICATIONS

International Search Report corresponding to PCT/JP2012/064148, dated Jun. 28, 2012, 3 pages.

* cited by examiner

*Primary Examiner* — Mohammed Hasan
(74) *Attorney, Agent, or Firm* — Wilmer Cutler Pickering Hale and Dorr LLP

(57) ABSTRACT

An image display device may include a varifocal optical element that condenses a light beam emitted from a light source and scans a projection surface with the light beam from the varifocal optical element. The varifocal optical element may include lenses located side by side in a direction orthogonal to their optical axes that are in parallel with each other; an orthogonal plane mirror that reflects the beam that passes through one of the lens to the other lens; and an actuator that moves the orthogonal plane mirror in parallel along the optical axes of the lenses. The displacement of the actuator may be controlled based on the scanning angle.

11 Claims, 7 Drawing Sheets

IMAGE DISPLAY DEVICES

CROSS-REFERENCE TO RELATED APPLICATIONS

This application is a national stage application of International Application No. PCT/JP2012/064148 entitled "Image Display Device", filed on May 31, 2012, which claims the benefit of priority to Japanese patent application No. 2011-124331, filed on Jun. 2, 2011, the disclosures of each of which are hereby incorporated by reference in their entirety.

TECHNICAL FIELD

Image display devices can scan a projection surface with a light beam and thereby display an image thereon.

BACKGROUND

Image display devices that horizontally and vertically scan a projection surface with laser light and thereby display an image thereon are known (for example, Japanese Patent Publication No. 2007-121538A and Japanese Patent Publication No. 2008-268645A).

FIG. 1 shows the structure of a scanner of an image display device.

Referring to FIG. 1, the image display device includes light source 121; condenser lens 122 that condenses a laser beam emitted from light source 121 on projection surface 124; and scanning mirror 123 that scans projection surface 124 with the laser beam condensed by condenser lens 122.

Regularly, the size of each pixel of a displayed image depends on the diameter of the beam spot on projection surface 124. Thus, if condenser lens 122 and projection surface 124 are set such that the beam waist of the condensed laser beam is positioned at projection surface 124, the diameter of the beam can be decreased and a high-resolution image can be obtained.

However, since the optical path length of the laser beam from scanning mirror 123 to projection surface 124 changes based on the scanning angle of scanning mirror 123, the beam waist may not be positioned at projection surface 124 depending on the position thereon. In this case, the resolution becomes lower on a part of the screen.

Next, the reason why the resolution becomes lower on a part of the screen will be described.

FIG. 2 schematically shows that the optical path length and the beam waist change based on scanning angle θ.

Assuming that the effective diameter (radius) of scanning mirror 123 is denoted by w, the propagation distance is denoted by z, and the radius of the beam waist formed at a distance where the amplitude value becomes 1/e of the maximum value is denoted by $\omega_o$, the following equations 1 and 2 are satisfied. In these equations, λ is the wavelength of the laser beam; and π is a circular constant. The beam numerical aperture is given by ω/z.

[Mathematical Expression 1]

$$\omega^2 = \omega_0^2 \cdot \{1 + (z/a)^2\} \quad \text{(Equation 1)}$$

[Mathematical Expression 2]

$$a = \pi \cdot \omega_0^2 / \lambda \quad \text{(Equation 2)}$$

It is now assumed that the beam diameter (radius) on projection plane 124 is $\omega_0$ when scanning angle θ is zero and the beam waist is arranged on light path length L(0). Light path length L(0) is the distance from the surface of scanning mirror 123 to projection plane 124 on the light path of the central light beam of the laser beams. Projection distance f is the distance from condenser lens 122 to projection plane 124, and is determined by the focal length of condenser lens 122. When the distance from a principal point of condenser lens 122 to the surface of scanning mirror 123 is denoted by d, then light path length L(0) is a value which is obtained by subtracting distance d from projection distance f.

The distance from the surface of scanning mirror 123 to projection plane 124 on the light path of the central light beam of the laser beam when scanning angle θ is greater than 0, is assumed to be light path length L(θ). Then, light path length L(θ) is expressed by the following Equation 3.

[Mathematical Expression 3]

$$L(\theta) = L(0)/\cos\theta \quad \text{(Equation 3)}$$

If scanning angle θ is greater than 0, since optical path length L(θ) becomes greater than optical path length L(O), propagation distance z in equation 1 increases. As a result, the beam diameter (radius) increases from $2\omega_0$ to $2\omega(L(\theta))$. As scanning angle θ increases, the beam diameter (radius) on projection surface 124 becomes large. As a result, the size of each pixel increases and thereby the resolution of the image decreases in the circumferential region of the screen.

In the foregoing image display device, if a varifocal lens is used as condenser lens 122 and the focal length of the varifocal lens is controlled based on scanning angle θ such that the beam waist is positioned at projection surface 124, a high-resolution image can be equally displayed on the entire screen.

The varifocal lens is composed for example of a condenser lens, a divergent lens, and an actuator that moves the condenser lens in the optical axis direction. When the actuator moves the condenser lens, the distance between the condenser lens and the divergent lens changes and thereby the focal length changes.

FIG. 3A schematically shows the arrangement of the varifocal lens having a long focal length, whereas FIG. 3B shows the arrangement of the varifocal lens having a short focal length.

As shown in FIG. 3A, as distance d between condenser lens 130 and divergent lens 131 becomes short, back focus BF becomes long. In contrast, as shown in FIG. 3B, as distance d between condenser lens 130 and divergent lens 131 becomes large, back focus BF becomes short.

Back focus BF is expressed by the following equation 4.

[Mathematical Expression 4]

$$BF = \{f_1 - d\} \cdot f_2 / (f_1 + f_2 - d) \quad \text{(Equation 4)}$$

where $f_1$ denotes the focal length of condenser lens 130; and $f_2$ denotes the focal length of divergent lens 131.

As technologies for the foregoing varifocal lens, Japanese Patent Publication No. 2007-121538A describes a focusing optical system that is composed of a combination of a condenser lens and a divergent lens and Japanese Patent Publication No. 2008-268645A describes a structure in which an actuator moves a condenser lens in the optical axis direction.

DESCRIPTION

From a point of view of miniaturization and energy saving of image display devices, it is desirable to provide a small and low-power consumption varifocal lens.

Since an actuator is much larger than the other components of the varifocal lens (a condenser lens and a divergent lens), it may be beneficial to miniaturize the actuator so as to miniaturize the varifocal lens.

Actuators are, for example, piezoelectric type actuators and moving coil type actuators. Regardless of their types, as the displacement of the actuator becomes large, the drive power and size become large. In other words, as the displacement of the actuator becomes small, the drive power and size become small.

Thus, to realize a small and low-power consumption varifocal lens, it may be helpful to decrease the displacement of the actuator while the variable range of the focal length is kept.

In an image display device having the foregoing varifocal lens, the displacement required for the actuator in the varying range of the scanning angle may be as large as for example 80 μm. Thus, it is difficult to realize a small and low-power consumption varifocal lens.

If a condenser lens and a divergent lens have short focal lengths, the displacement required for the actuator can be deceased without changing the range of the focal length. However, in this case, the following problem will occur.

If the focal length is short, the aberrations of the lenses (spherical aberration and so forth) increase. Aberrations are factors that change the shape of a beam spot on the projection surface. If aberrations increase, the shape of the beam spot changes and thereby the image quality deteriorates.

In addition, if the focal length is short, due to the influence of aberrations, it may be helpful to decrease the lens diameter (more specifically, numerical aperture NA= lens radius/focal length). Thus, since the numerical aperture becomes small, it becomes difficult to narrow the light beam from a point of view of diffraction limit. As a result, the diameter of the beam spot on projection surface 124 increases.

For example, in a varifocal lens that is composed of a combination of a condenser lens having a focal length of 10 mm and a divergent lens having a focal length of −5 mm, if the diameter of a collimated beam that enters the condenser lens is 4 mm and the back focal length is 100 mm, the diameter of the beam spot becomes 40 μm.

In contrast, in a varifocal lens that is composed of a combination of a condenser lens having a focal length of 5 mm and a divergent lens having a focal length of −2.5 mm, if the diameter of a collimated beam that enters the condenser lens is 2 mm and the back focal length is 100 mm from a point of view of aberrations, the diameter of the beam spot becomes 80 μm. In this way, if the focal length is short, the diameter of the beam spot is doubled due to the influence of diffraction limit.

Since the size of each of pixels of a display image depends on the diameter of the beam spot, if the diameter of the beam spot increases, the resolution of the image becomes lower.

It would be desirable to provide smaller, low power image display devices that can display a high-resolution and high-quality image on the entire screen.

To accomplish the foregoing, an image display device may include:

an optical element that condenses a light beam and has a variable focal length, wherein the optical element comprises
a first lens and a second lens that have optical axes parallel to each other, wherein said first and second lenses are located side by side in a direction orthogonal to said optical axes,
a reflector that receives said light beam through said first lens and reflects the light beam to said second lens, and
at least one actuator that moves at least one of said reflector, said first lens, and said second lens in a direction parallel to said optical axes;
a scanner that scans a projection surface with said light beam condensed by said optical element; and
a controller that controls said scanner based on a video signal to display an image on said projection surface, controls said focal length of said optical element based on a scanning angle of said scanner, and controls said at least one actuator to change the focal length of said optical element

DESCRIPTION OF REFERENCE NUMERALS

Figure 1:
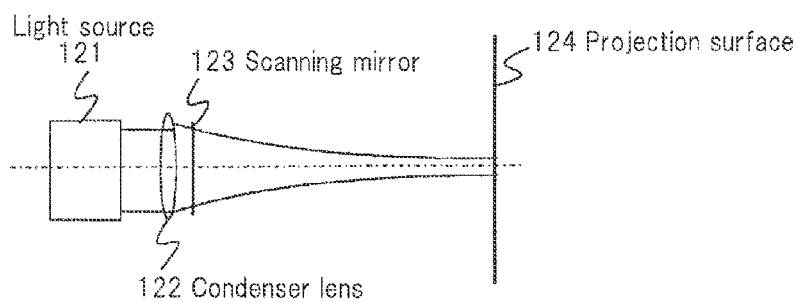
[FIG. 1] is a schematic diagram showing the ordinary structure of a scanning section of an image display device.
Figure 2:
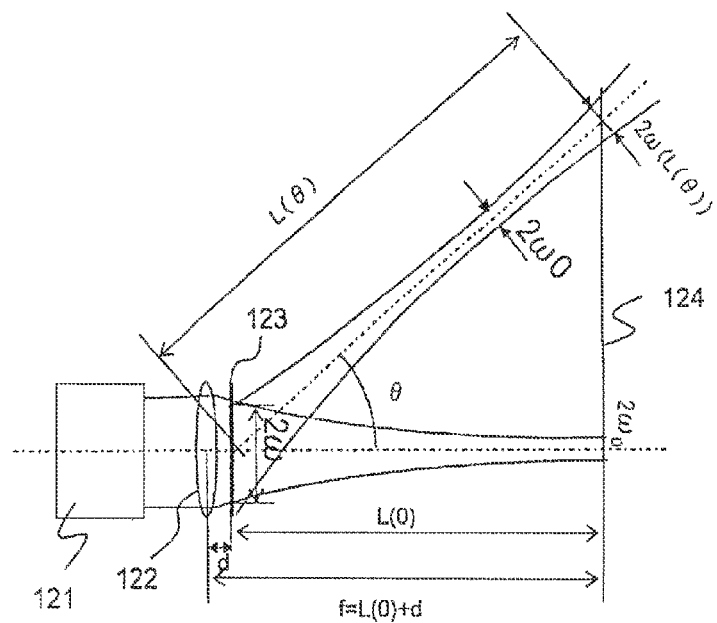
[FIG. 2] is a schematic diagram showing that the optical path length and beam waist change based on the scanning angle of the image display device shown in FIG. 1.

1 Light source
2 Collimator lens
3 Mirror
4 Varifocal optical element
5 Horizontal scanning mirror
6 Vertical scanning mirror
7 Projection surface
8 Control section (e.g., controller)
9 Video signal control section (e.g., video signal controller)

10 Scanning mirror control section (e.g., scanning mirror controller)
40, 41 Lenses
42 Orthogonal plain mirror
42a, 42b Plain mirrors
43 Actuator Next, with reference to the accompanying drawings, exemplary embodiments will be described.

(First Exemplary Embodiment)

Figure 4:
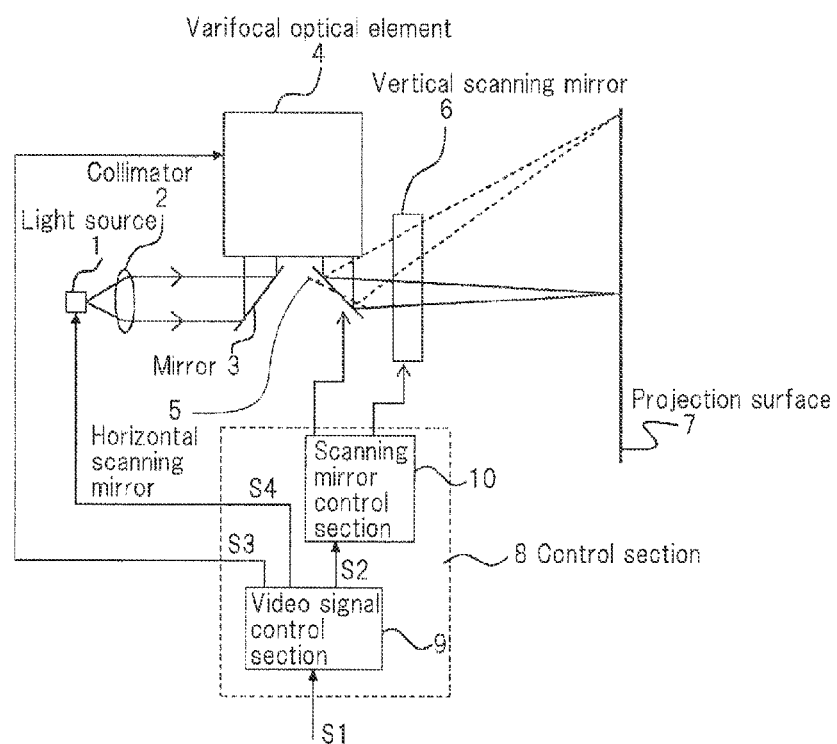
[FIG. 4] is a block diagram showing the structure of a scanning type image display device according to a first exemplary embodiment.

FIG. 4 is a block diagram showing the structure of a scanning type image display device according to a first exemplary embodiment.

Referring to FIG. 4, the scanning type image display device, which is of the rear projection type, includes light source 1, collimator lens 2, mirror 3, varifocal optical element 4, horizontal scanning mirror 5, vertical scanning mirror 6, projection surface 7, and control section 8. Control section 8 may be, for example, a controller. The distance from vertical scanning mirror 6 to projection surface 7 is fixed.

Light source 1 is a solid light source as typified by a semiconductor laser. Collimator lens 2 and mirror 3 are arranged in this order in the direction of travel of the laser beam from light source 1. Collimator lens 2 collimates the laser beam from light source 1. Mirror 3 reflects the laser beam that passes through collimator lens 2 at an angle of around 90 degrees.

Located in the traveling direction of the laser beam reflected by mirror 3 is varifocal optical element 4. Varifocal optical element 4 condenses the laser beam reflected by mirror 3. The focal length of varifocal optical element 4 is variable.

Figure 5:
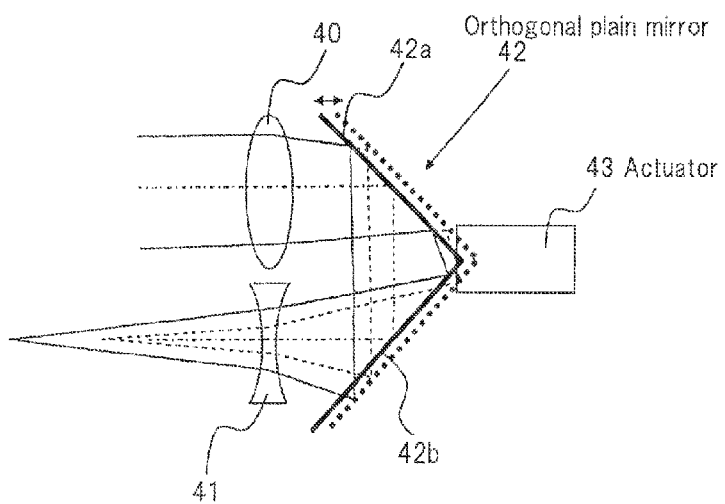
[FIG. 5] is a schematic diagram showing the structure of a varifocal optical element of the scanning type image display device shown in FIG. 4.

FIG. 5 shows the structure of varifocal optical element 4.

Referring to FIG. 5, varifocal optical element 4 includes lens 40 having a positive refractive power; lens 41 having a negative refractive power; orthogonal plain mirror 42; and actuator 43.

Lenses 40 and 41 are located side by side in a direction orthogonal to their optical axes that are in parallel with each other.

Orthogonal plain mirror 42 is a reflector that reflects the laser beam that passes through lens 40 to lens 41 and is composed of two plane mirrors 42a and 42b that are unitarily formed such that their surfaces are orthogonal to each other.

The center ray of the laser beam (the optical axis of lens 40) that passes through lens 40 enters plane mirror 42a at an incident angle of around 45°. The center ray of the laser beam that is reflected by plane mirror 42a enters plane mirror 42b at an incident angle of around 45°. The center ray of the laser beam reflected by plane mirror 42b matches the optical axis of lens 41.

Actuator 43 moves orthogonal plain mirror 42 in parallel in the optical axis directions of lenses 40 and 41. Actuator 43 may be, for example, a piezoelectric type actuator or a moving coil type actuator. According to this embodiment, actuator 43 is a multilayered piezoelectric actuator and has a length of 40 mm. If a voltage of 150 V is applied to actuator 43, its displacement is 40 μm. The drive frequency of actuator 43 is, for example, 12 kHz.

Referring to FIG. 4 again, located in the traveling direction of the laser beam exited from varifocal optical element 4 is a scanner including a horizontal scanning mirror 5 and vertical scanning mirror 6. Horizontal scanning mirror 5 and vertical scanning mirror 6 may be resonance scanning mirrors as typified by micro mechanical mirrors (MEMS), galvano mirrors, or the like. In the example shown in FIG. 4, horizontal scanning mirror 5 and vertical scanning mirror 6 are independently provided. Alternatively, a resonance scanning mirror that two-dimensionally scans a target with a laser beam may be used instead of horizontal scanning mirror 5 and vertical scanning mirror 6.

The scanning frequency of horizontal scanning mirror 5 is, for example, 6 kHz that is half of the drive frequency of actuator 43. The scanning frequency of vertical scanning mirror 6 is 60 Hz and the number of horizontal scanning lines is 200.

Control section 8 controls the operation of the entire scanning type image display device and includes video signal control section 9 and scanning mirror control section 10. Video signal control section 9 may be, for example, a video signal controller. Scanning mirror control section 10 may be, for example, a scanning mirror controller.

Video signal S1 is supplied from an external unit to video signal control section 9. The external unit is, for example, a video supply unit such as a personal computer.

Video signal control section 9 supplies synchronous signal S2 (vertical synchronous signal and horizontal synchronous signal), which is used for vertical synchronization and horizontal synchronization in displaying an image based on video signal S1, to scanning mirror control section 10.

In addition, video signal control section 9 holds characteristic data (a lookup table) that represent the relationship between horizontal and vertical scanning angles and the displacement (specifically, applied voltage values) of actuator 43. Video signal control section 9 determines the scanning angles of each pixel based on synchronous signal S2 (vertical scanning signal and horizontal scanning signal) and obtains the displacement (an applied voltage value) based on the scanning angles from the characteristic data. Thereafter, video signal control section 9 supplies control signal S3 based on the displacement (applied voltage value) that has been obtained to varifocal optical element 4. The focal length of varifocal optical element 4 changes since actuator 43 operates based on control signal S3.

The characteristic data are, for example, a table that correlates scanning angle θ in the range from 0° to maximum angle $θ_{max}$ and the corresponding displacements (specifically, applied voltage values) of actuator 43. Scanning angle θ is incremented, for example, by 0.5°, but not limited thereto. Thus, scanning angle θ can be incremented by any value.

In addition, video signal control section 9 counts the pulses of the horizontal scanning signal and the pulses of the pixel clock from the beginning of the vertical scanning interval and can determine the pixel position scanned by the laser beam based on the count values. Since the number of pixels of the entire screen and the horizontal and vertical scanning angles of individual pixels have been predetermined, video signal control section 9 determines the current irradiation position of the laser beam based on the count values and can determine the scanning angles based on the determined position.

In addition, video signal control section 9 generates intensity modulation signal S4 based on video signal S1 and supplies the generated intensity modulation signal S4 to light source 1. If light source 1 is, for example, a semiconductor laser, video signal control section 9 controls the current (current supply amount and current supply time) supplied to the semiconductor laser based on intensity modulation signal S4.

Alternatively, a modulator may be located on the optical path of the laser beam emitted from light source 1. In this case, the transmissivity of the modulator may be controlled based on intensity modulation signal S4 with constant power supplied to light source 1.

Scanning mirror control section 10 controls horizontal scanning mirror 5 based on the horizontal scanning signal of synchronous signal S2 and controls vertical scanning mirror 6 based on the vertical scanning signal of synchronous signal S2.

Figure 6A:
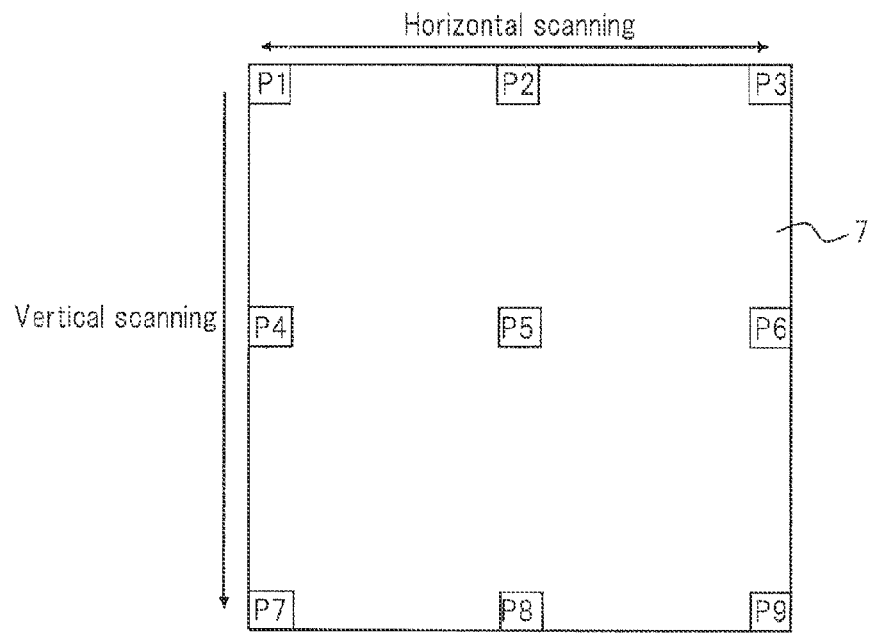
[FIG. 6A] is a schematic diagram describing horizontal and vertical scanning of the scanning type image display device shown in FIG. 4.
Figure 6B:
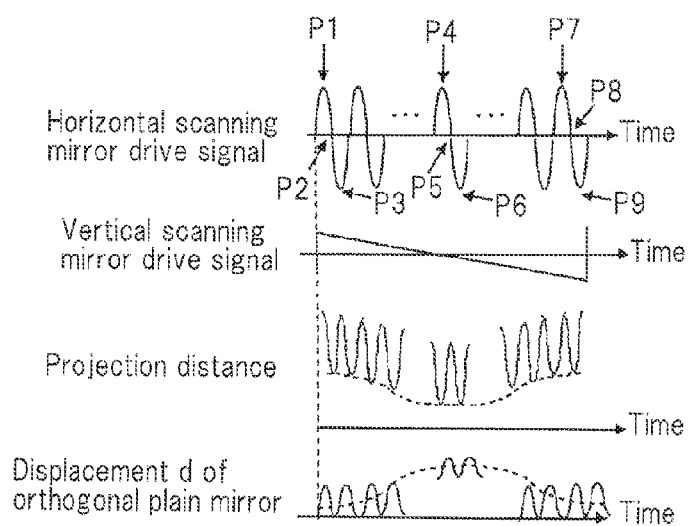
[FIG. 6B] is a schematic diagram describing the drive signal of a horizontal scanning mirror, the drive signal of a vertical scanning mirror, a change of the projection distance, and displacement of the orthogonal plain mirror of the scanning type image display device shown in FIG. 4.

FIG. 6A shows leftmost, center, and rightmost pixels on top, middle, and bottom horizontal scanning lines. FIG. 6B shows a drive signal of horizontal scanning mirror 5, a drive signal of vertical scanning mirror 6, a change of projection distance, and displacement of orthogonal plain mirror 42.

Pixels P1, P2, and P3 represent leftmost, center, and rightmost pixels on the top horizontal scanning line, respectively. Pixel P1 is located at the upper left corner of projection surface 7, whereas pixel P3 is located at the upper light corner of projection surface 7.

Pixels P4, P5, and P6 represent leftmost, center, and rightmost pixels on the middle horizontal scanning line, respectively. Pixel P5 is located nearly at the center of projection surface 7.

Pixels P7, P8, and P9 represent leftmost, center, and rightmost pixels on the bottom horizontal scanning line, respectively. Pixel P7 is located at the lower left corner of projection surface 7. Pixel P9 is located at the lower right corner of projection surface 7.

Scanning mirror control section 10 supplies a sinusoidal drive signal to horizontal scanning mirror 5 and supplies a saw-tooth wave drive signal to vertical scanning mirror 6. In the sinusoidal drive signal, the first cycle having a positive peak and a negative peak correspond to the top horizontal scanning line. The positive peak, 0 point, and negative peak correspond to pixels P1, P2, and P3, respectively. Cycles each having a positive peak and a negative peak correspond to scanning lines in one vertical scanning interval.

In one horizontal scanning interval, the projection distance becomes maximum at the leftmost pixel and the rightmost pixel and becomes minimum at the center pixel. The change of the projection distance in one horizontal scanning interval becomes maximum on the top horizontal scanning line and the bottom horizontal scanning line and becomes minimum on the center horizontal scanning line.

The average of the projection distance in one horizontal scanning interval gradually decreases as scanning proceeds from the top horizontal scanning line to the middle horizontal scanning line. The average of the projection distance in one horizontal scanning interval becomes minimum when scanning proceeds to the middle horizontal scanning line. Likewise, the average of the projection distance gradually increases as scanning proceeds from the center horizontal scanning line to the bottom horizontal scanning line. In the graph of the projection distance shown in FIG. 6B, the change of the average of the projection distance is depicted by a broken line.

In one horizontal scanning interval, parallel movement (displacement) amount d of orthogonal plain mirror 42 is minimum at the leftmost and rightmost pixels and is maximum at the center pixel. The range of the parallel movement (displacement) of orthogonal plain mirror 42 in one horizontal scanning interval is minimum on the top horizontal scanning line and bottom horizontal scanning line and is maximum on the center horizontal scanning line.

The average of parallel movement (displacement) amount d in one vertical scanning interval gradually increases as scanning proceeds from the top horizontal scanning line to the middle horizontal scanning line, becomes maximum as scanning proceeds to the middle horizontal scanning line, and gradually decreases as scanning proceeds from the center horizontal scanning line to the bottom horizontal scanning line. In the graph of displacement d of the orthogonal plain mirror shown in FIG. 6B, the change of the average of parallel movement (displacement) amount d is depicted by a broken line.

Video signal control section 9 supplies control signal S3 based on displacement d of the orthogonal plain mirror shown in FIG. 6B to actuator 43. The period of change of displacement d of the orthogonal plain mirror is half of the period of change of the horizontal scanning angle. In one horizontal scanning interval, displacement d of the orthogonal plain mirror decreases as scanning proceeds to the ends of each horizontal scanning line. In one vertical scanning interval, the range of displacement d of the orthogonal plain mirror is maximum on the center horizontal scanning line and decreases as scanning proceeds to the top horizontal scanning line and the bottom horizontal scanning line.

In the foregoing scanning type image display device according to the foregoing embodiment, control section 8 controls the scanning angles of the scanner (horizontal scanning mirror 5 and vertical scanning mirror 6) based on video signal S1 and also controls the focal length of varifocal optical element 4 based on the scanning angles. Thus, since a beam waist can be formed on the projection surface regardless of the scanning angles, a high-resolution and high-quality image can be obtained on the entire screen.

In addition, since varifocal optical element 4 is composed of actuator 43 having a small displacement, varifocal optical element 4 can be miniaturized and energy saved. Next, this reason will be described in detail.

In varifocal optical element 4 shown in FIG. 5, if actuator 43 moves orthogonal plain mirror 42 in parallel in the direction of lenses 40 and 41 by distance d, the optical path length from lens 40 to lens 41 becomes short by 2d compared to the prior optical path length of lens 40 to lens 41. As the optical path length changes, the focal length of varifocal optical element 4 becomes long.

In contrast, if actuator 43 moves orthogonal plain mirror 42 in parallel in the direction opposite to lenses 40 and 41 by distance d, the optical path length from lens 40 to lens 41 becomes long by 2d compared to the prior optical path length of lens 40 to lens 41. As the optical path length changes, the focal length of varifocal optical element 4 becomes short.

The focal length of varifocal optical element 4 can be obtained from the foregoing equation 4. In equation 4, d denotes the optical path length from lens 40 to lens 41. As described above, as actuator 43 moves orthogonal plain mirror 42 by parallel movement amount d, the change of the optical path length becomes 2d. In other words, the displacement of actuator 43 is half of the change of the optical path length.

Figure 3A:
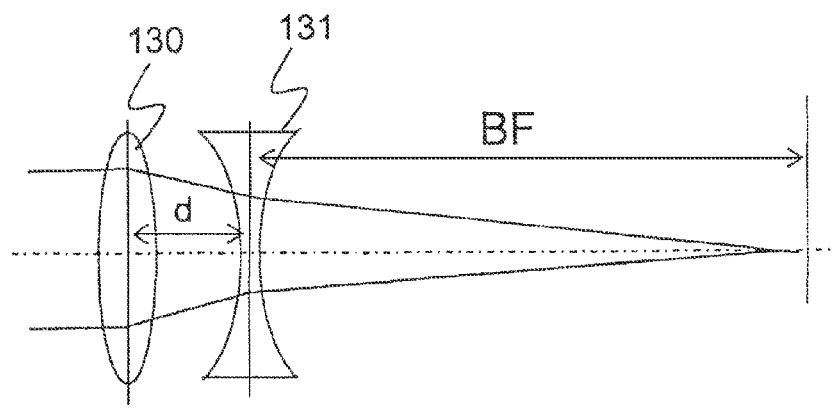
[FIG. 3A] is a schematic diagram showing the arrangement of a varifocal lens having a long focal length.
Figure 3B:
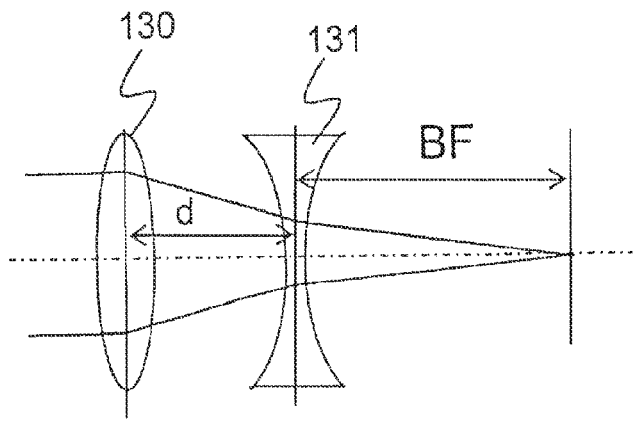
[FIG. 3B] is a schematic diagram showing the arrangement of a varifocal lens having a short focal length.

By contrast, as shown in FIG. 3A and FIG. 3B, in the structure (comparative example) in which condenser lens 130 and divergent lens 131 are located side by side along a straight line and in which an actuator moves condenser lens 130 in parallel in the optical axis direction, as the actuator moves condenser lens 130 by parallel movement amount d, the change of the optical path length is d. In other words, the change of the actuator is the same as the change of the optical path length.

As described above, the displacement of the actuator of varifocal optical element 4 is half of the displacement of the actuator of the foregoing comparative example. Thus, an actuator that is smaller and that has a lower drive power consumption than the comparative example can be used.

In addition, since the displacement of the actuator is small, the following effect can be obtained.

As the displacement of an actuator is large, the maximum drive frequency of the actuator will become lower. Thus, if the displacement of the actuator is large, the response performance will deteriorate. Since the displacement of the actuator of varifocal optical element 4 is smaller than that of the foregoing comparative example, the maximum drive frequency of the actuator can be raised and thereby the response performance can be improved. As the response performance is improved, the focal length of varifocal optical element 4 can be precisely controlled based on the scanning angles. As a result, in the entire screen, the beam waist can be accurately and precisely positioned at projection surface 7.

The scanning type image display device according to this embodiment is exemplary. Thus, the structure of the scanning type image display device can be appropriately modified. For example, a right-angled prism (for example, a corner cube) may be used instead of orthogonal plain mirror 42. In this case, two plane surfaces that are orthogonal to each other of the right-angled prism are reflection surfaces.

Alternatively, light source 1 may be composed of red, green, and blue laser light sources. Collimator lens 2 may be applied to each laser light source. In this case, laser beams emitted from the individual laser light sources may be formed as one laser beam using a color combining optical system such as a dichroic mirror or a fiber coupler. In this case, video signal control section 9 modulates laser light emitted from individual laser light sources of light source 1 with intensity modulation signal S4 based on luminance signals of an image corresponding to red, green, and blue contained in video signal S1.

In FIG. 5, lenses 40 and 41 are located side by side in a direction orthogonal to their optical axis directions, whereas the position of lens 40 may be different from that of lens 41 in the optical axis directions.

(Second Exemplary Embodiment)

A scanning type image display device according to a second exemplary embodiment is basically the same as that according to the first exemplary embodiment except for part of varifocal optical element 4.

Figure 7:
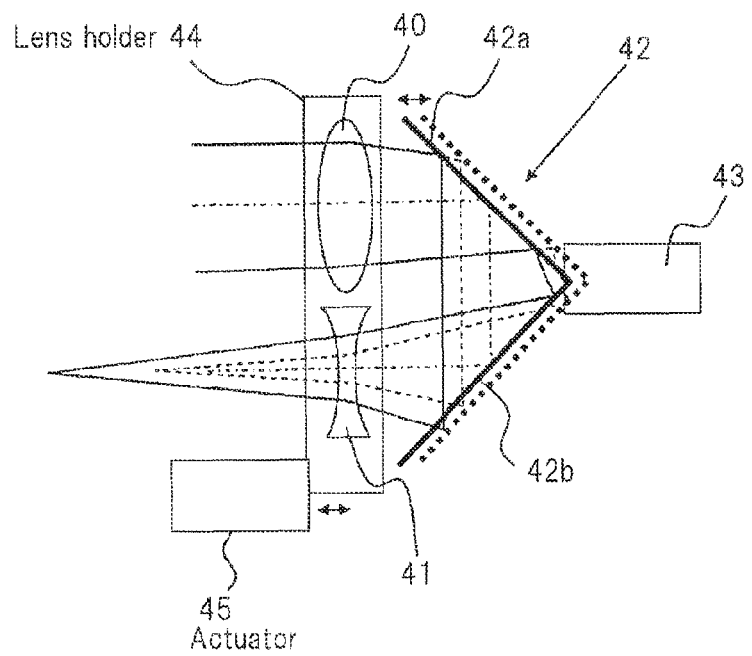
[FIG. 7] is a schematic diagram showing the structure of a varifocal optical element used for a scanning type image display device according to a second exemplary embodiment.

FIG. 7 shows the structure of varifocal optical element 4 used for the scanning type image display device according to the second exemplary embodiment.

Referring to FIG. 7, the structure of varifocal optical element 4 is the same as the structure shown in FIG. 5 except that the former further includes lens holder 44 and actuator 45.

Lens holder 44 holds lenses 40 and 41. Actuator 45 moves lens holder 44 in parallel in the optical axis directions of lenses 40 and 41.

Like actuator 43, actuator 45 may be, for example, a piezoelectric type actuator or a moving coil type actuator. In this example, both actuators 43 and 45 are multilayered piezoelectric type actuators. The length of each of the actuators is 20 mm. If a voltage of 150 V is applied to actuators 43 and 45, the displacement of each of actuators 43 and 45 is 20 μm. The drive frequency of each of actuators 43 and 45 is, for example, 12 kHz.

In the scanning type image display device according to this embodiment, although video signal control section 9 changes the focal length of varifocal optical element 4 based on the scanning angles, video signal control section 9 controls actuators 43 and 45 such that actuators 43 and 45 move orthogonal plain mirror 42 and lens holder 44 in parallel in the opposite directions, respectively.

Specifically, if the focal length is increased, video signal control section 9 controls actuators 43 and 45 such that the distance between orthogonal plain mirror 42 and lens holder 44 becomes short. In contrast, if the focal length is decreased, video signal control section 9 controls actuators 43 and 45 such that the distance between orthogonal plain mirror 42 and lens holder 44 becomes large.

The change of the optical path length from lens 40 to lens 41 depends on the total of the displacement of orthogonal plain mirror 42 moved by actuator 43 and the displacement of lens holder 44 moved by actuator 45.

For example, if the displacement of orthogonal plain mirror 42 is d and the displacement of lens holder 44 is d, the change of the optical path length from lens 40 to lens 41 becomes 4d. In this case, the displacement of actuators 43 and 45 is ¼ of the change of the optical path length.

On the other hand, as shown in FIG. 3A and FIG. 3B, in the structure (comparative example) in which condenser lens 130 and divergent lens 131 are located side by side along a straight line and in which condenser lens 130 and divergent lens 131 are moved in parallel in their optical axis directions by respective actuators, the parallel movement amount of each actuator is d, whereas the change of the optical path length is 2d. In other words, the displacement of each of the actuators is half of the change of the optical path length.

As described above, the displacement of each of the actuators of the scanning type image display device according to this embodiment is half of the displacement of the actuator of the foregoing comparative example. Thus, actuators that are smaller and that reduce drive power consumption to levels that are lower than those in the comparative example can be used. This is because the length of the multilayered piezoelectric type actuator is proportional to the displacement. In addition, since the displacement of each of the actuators is small, they can be driven at high drive frequencies and thereby the number of horizontal scanning lines can be increased.

In addition, according to the second exemplary embodiment, as well as the foregoing effect, the effect of the first exemplary embodiment can be also obtained.

It should be noted that the scanning type image display device according to this embodiment is exemplary. Thus, the structure of the scanning type image display device can be appropriately modified.

For example, lens holder 44 or orthogonal plain mirror 42 may be fixed, whereas the other may be moved in parallel in the optical axis direction.

Alternatively, a lens having a positive refractive power may be used instead of lens 41.

(Third Exemplary Embodiment)

A scanning type image display device according to a third exemplary embodiment is basically the same as that according to the first exemplary embodiment except for part of varifocal optical element 4.

Figure 8:
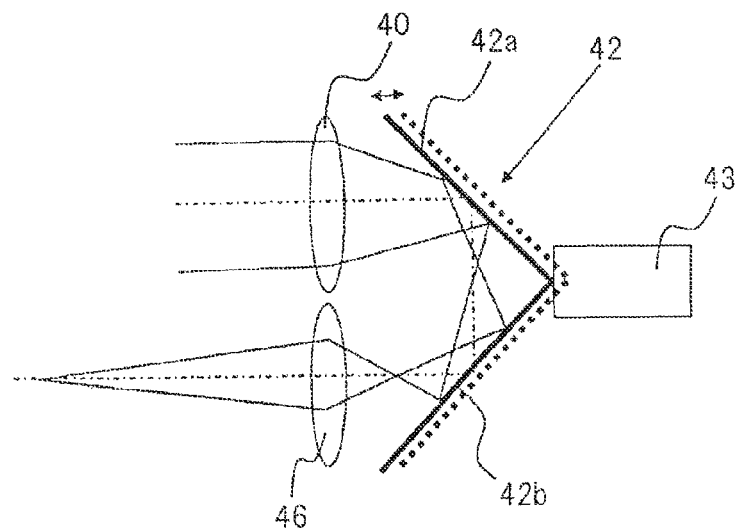
[FIG. 8] is a schematic diagram showing the structure of a varifocal optical element used for a scanning type image display device according to a third exemplary embodiment.

FIG. 8 shows the structure of varifocal optical element 4 used for the scanning type image display device according to the third exemplary embodiment.

Referring to FIG. 8, the structure of varifocal optical element 4 is the same as that shown in FIG. 5 except that lens 41 is replaced with lens 46 having a positive refractive power. With respect to the center ray of the laser beam that passes through lens 40, the center ray of the laser beam reflected by plane mirror 42b matches the optical axis of lens 46.

Assuming that the focal length of lens 41 is denoted by $f_1$ and the focal length of lens 46 is denoted by $f_2$, the optical path length from lens 41 to lens 46 (distance between lens 41 and lens 46) nearly matches "$f_1+f_2$."

With two lenses 41 and 46 having positive refractive powers, since the distance between the lenses can be increased in comparison with a structure that consists of a combination of lens 40 having a positive refractive power and lens 41 having a negative refractive power, the degree of freedom of the location of orthogonal plain mirror 42 is improved.

With the scanning type image display device according to the third exemplary embodiment, as well as the foregoing effect, the effect of the first exemplary embodiment can be also obtained.

(Fourth Exemplary Embodiment)

A scanning type image display device according to a fourth exemplary embodiment is basically the same as that according to the first exemplary embodiment except for part of varifocal optical element 4.

Figure 9:
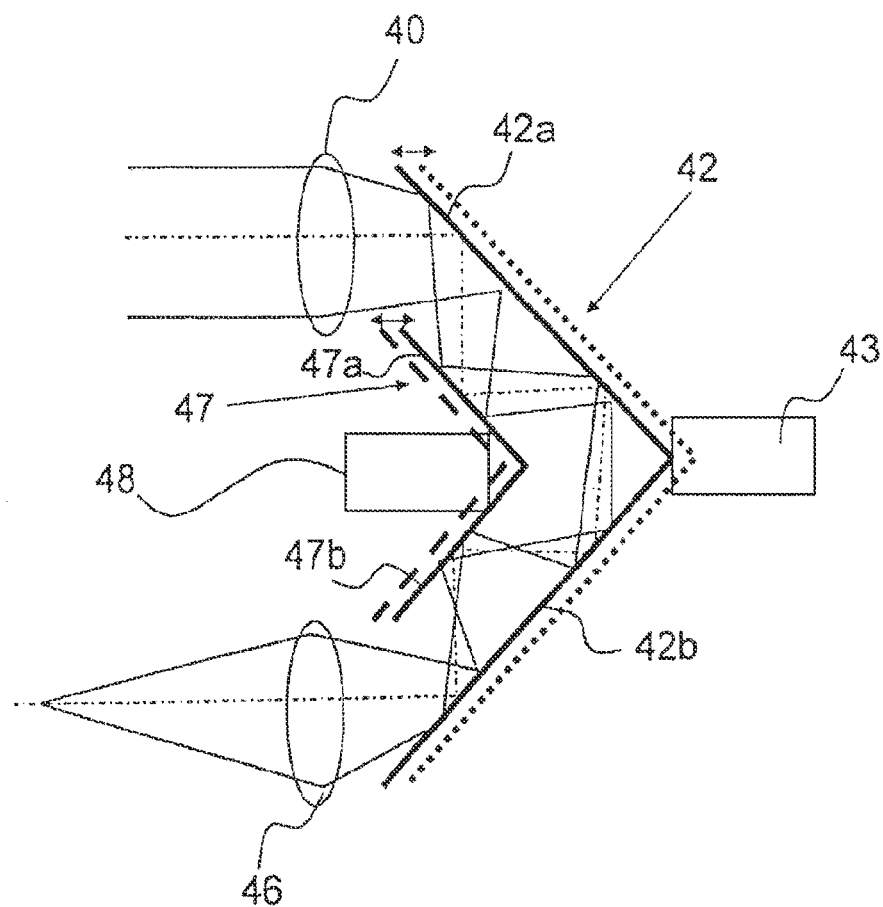
[FIG. 9] is a schematic diagram showing the structure of a varifocal optical element used for a scanning type image display device according to a fourth exemplary embodiment.

FIG. 9 shows the structure of varifocal optical element 4 used for the scanning type image display device according to the fourth exemplary embodiment.

Referring to FIG. 9, the structure of varifocal optical element 4 according to the fourth exemplary embodiment is the same as that according to the first exemplary embodiment except that the former further includes orthogonal plain mirror 47 and actuator 48 and that lens 41 is replaced with lens 46 having a positive refractive power.

Orthogonal plain mirrors 42 and 47 form at least part of a reflector that reflects the laser beam that passes through lens 40 to lens 46.

Orthogonal plain mirror 47 is composed of two plane mirrors 47a and 47b that are unitarily formed such that their mirror surfaces are orthogonal to each other. Plane mirror 47a is located such that it faces plane mirror 42a of orthogonal plain mirror 42. Likewise, plane mirror 47b is located such that it faces plane mirror 42b of orthogonal plain mirror 42.

The center ray (the optical axis of lens 40) of the laser beam that passes through lens 40 enters plane mirror 42a at an incident angle of around 45°. The center ray of the laser beam reflected by plane mirror 42a enters plane mirror 47a at an incident angle of around 45°.

The center ray of the laser beam reflected by plane mirror 47a enters plane mirror 42a at an incident angle of around 45°. The center ray of the laser beam reflected by plane mirror 42a enters plane mirror 42b at an incident angle of around 45°.

The center ray of the laser beam reflected by plane mirror 42b enters plane mirror 47b at an incident angle of around 45°. The center ray of the laser beam reflected by plane mirror 47b enters plane mirror 42b at an incident angle of around 45°.

The center ray of the laser beam reflected by plane mirror 42b matches the optical axis of lens 46.

Actuator 43 moves orthogonal plain mirror 42 in parallel in the optical axis directions of lenses 40 and 46. Actuator 48 moves orthogonal plain mirror 47 in parallel in the optical axis directions of lenses 40 and 46. Actuators 43 and 48 may be, for example, piezoelectric type actuators or moving coil type actuators. According to this embodiment, each of actuators 43 and 48 is a multilayered piezoelectric actuator and has a length of, for example, 7 mm. If a voltage of 150 V is applied to each of actuators 43 and 48, their displacement is, for example, 7 μm. The drive frequency of each of actuators 43 and 48 is, for example, 12 kHz.

Assuming that the focal length of lens 41 is denoted by $f_1$ and the focal length of lens 46 is denoted by $f_2$, the optical path length from lens 41 to lens 46 (distance between lens 41 and lens 46) nearly matches "$f_1+f_2$."

With two lenses 41 and 46 having positive refractive powers, since the distance between the lenses can be increased in comparison with a structure that consists of a combination of lens 40 having a positive refractive power and lens 41 having a negative refractive power of the first exemplary embodiment, the degree of freedom of the locations of orthogonal plain mirrors 42 and 47 is improved.

In the scanning type image display device according to this embodiment, although video signal control section 9 changes the focal length of varifocal optical element 4 based on the scanning angles, video signal control section 9 controls actuators 43 and 48 such that actuators 43 and 48 move orthogonal plain mirrors 42 and 47 in parallel in the opposite directions, respectively.

Specifically, if the focal length is increased, video signal control section 9 controls actuators 43 and 48 such that the distance between orthogonal plain mirrors 42 and 47 becomes short. In contrast, if the focal length is decreased, video signal control section 9 controls actuators 43 and 48 such that the distance between orthogonal plain mirrors 42 and 47 becomes large.

The change of the optical path length from lens 40 to lens 46 depends on the total of the displacement of orthogonal plain mirror 42 moved by actuator 43 and the displacement of orthogonal plain mirror 47 moved by actuator 48.

For example, if the displacement of orthogonal plain mirror 42 is d and the displacement of orthogonal plain mirror 47 is d, the change of the optical path length from lens 40 to lens 46 becomes 6d. In this case, the displacement of each of actuators 43 and 48 is ⅙ of the change of the optical path length.

On the other hand, as shown in FIG. 3A and FIG. 3B, in the structure (comparative example) in which condenser lens 130 and divergent lens 131 are located side by side along a straight line and in which condenser lens 130 and divergent lens 131 are moved in parallel in their optical axis directions by respective actuators, the parallel movement amount of each actuator is d, whereas the change of the optical path length is 2d. In other words, the displacement of each of the actuators is half of the change of the optical path length.

As described above, the displacement of each of the actuators of the scanning type image display device according to this embodiment is ⅓ of the displacement of the actuator of the foregoing comparative example. Thus, actuators that are smaller and reduce drive power consumption to levels that are lower than those in the comparative example can be used.

In addition, according to the fourth exemplary embodiment, as well as the foregoing effect, the effects of the first exemplary embodiment and the second exemplary embodiment can be also obtained.

It should be noted that the scanning type image display device according to this embodiment is exemplary. Thus, the structure of the scanning type image display device can be appropriately modified.

For example, orthogonal plane mirror 42 or 47 may be fixed, whereas the other may be moved in parallel in the optical axis direction.

Alternatively, a lens having a negative refractive power may be used instead of lens 46.

Alternatively, at least one of plane mirrors 42a and 42b may have a curved (concave surface or convex surface) reflection surface. Likewise, at least one of plane mirrors 47a and 47b may have a curved (concave surface or convex surface) reflection surface.

The displacement of actuator 43 may be different from the displacement of actuator 48. Since the mass of orthogonal plain mirror 42 is greater than that of orthogonal plain mirror 47, if the displacement of actuator 43 is decreased in comparison with that of actuator 48, the load imposed on actuator 43 can be reduced.

(Fifth Exemplary Embodiment)

A scanning type image display device according to a fifth exemplary embodiment is basically the same as that according to the first exemplary embodiment except for part of varifocal optical element 4.

Figure 10:
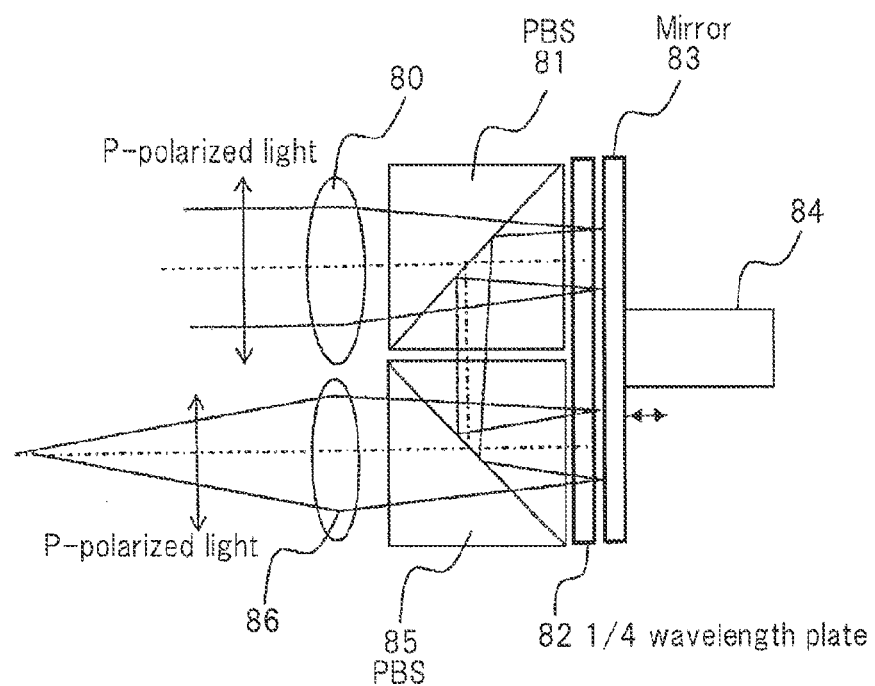
[FIG. 10] is a schematic diagram showing the structure of a varifocal optical element used for a scanning type image display device according to a fifth exemplary embodiment.

FIG. 10 shows the structure of varifocal optical element 4 used for the scanning type image display device according to the fifth exemplary embodiment.

Referring to FIG. 10, varifocal optical element 4 has lenses 80 and 86 having positive refractive powers, polarizing beam splitters (PBSs) 81 and 85, ¼ wavelength plate 82, mirror 83, and actuator 84.

Lenses 80 and 86 are similar to lenses 40 and 46 shown in FIG. 7 and FIG. 9. Lenses 80 and 86 are located side by side in a direction orthogonal to their optical axes that are in parallel with each other. Assuming that the focal length of lens 80 is denoted by $f_1$ and the focal length of lens 86 is denoted by $f_2$, the distance between lens 80 and lens 86 (optical path length from lens 80 to lens 86) nearly matches "$f_1+f_2$."

Mirror 83 is located such that it faces lenses 80 and 86. ¼ wavelength plate 82 is located between lenses 80 and 86 and mirror 83.

PBS 81 is located between lens 80 and ¼ wavelength plate 82. PBS 85 is located between lens 86 and ¼ wavelength plate 82.

PBS 81 is located in the traveling direction of the laser beam that passes through lens 80. PBS 81 is a cuboid of which the oblique surfaces of two right-angled prisms adhered to each other. Located on the adhered surface is a polarizing reflection surface that transmits P-polarized light and that reflects S-polarized light. The angle between the optical axis of lens 80 and the polarizing reflection surface of PBS 81 is around 45°.

The structure of PBS 85 is similar to that of PBS 81. The angle between the optical axis of lens 86 and the polarizing reflection surface of PBS 85 is around 45°. The angle between the polarizing reflection surface of PBS 81 and the polarizing reflection surface of PBS 85 is around 45°.

Actuator 84 moves mirror 83 in parallel in the optical axis directions of lenses 80 and 86. Actuator 84 may be, for example, a piezoelectric type actuator or a moving coil type actuator. According to this embodiment, actuator 84 is a multilayered piezoelectric actuator and has a length of 10 mm. If a voltage of 150 V is applied to actuator 84, its displacement is 10 μm. The drive frequency of actuator 84 is, for example, 12 kHz.

In the varifocal optical device shown in FIG. 10, the P-polarized laser beam that passes through lens 80 is transmitted through PBS 81. The P-polarized laser beam that is transmitted through PBS 81 passes through ¼ wavelength plate 82. Thereafter, the P-polarized laser beam is reflected in the direction of PBS 81 by mirror 83. The reflected light of mirror 83 passes through ¼ wavelength plate 82 and then enters PBS 81.

The P-polarized laser beam that passes through PBS 81 passes through ¼ wavelength plate 82 twice namely when the P-polarized laser beam travels to mirror 83 and when the P-polarized laser beam that passes through mirror 83 returns to PBS 81. As a result, the S-polarized laser beam enters PBS 81 through ¼ wavelength plate 82 from mirror 83 side.

PBS 81 reflects the S-polarized laser beam that passes through ¼ wavelength plate 82 to PBS 85. PBS 85 reflects the S-polarized laser beam that passes through PBS 81 to ¼ wavelength plate 82.

The S-polarized laser beam that passes through PBS 85 passes through ¼ wavelength plate 82. Thereafter, the S-polarized laser beam is reflected in the direction of PBS 85 by mirror 83. The reflected light of mirror 83 passes through ¼ wavelength plate 82 and then enters PBS 85.

The S-polarized laser beam that passes through PBS 85 passes through ¼ wavelength plate 82 twice namely when the S-polarized laser beam travels to mirror 83 and when the 5-polarized laser beam that passes through mirror 83 returns to PBS 85. As a result, the P-polarized laser beam enters PBS 85 through ¼ wavelength plate 82 from mirror 83 side.

The P-polarized laser beam from ¼ wavelength plate 82 directly passes through PBS 85.

In the scanning type image display device according to this embodiment, video signal control section 9 changes the focal length of the varifocal optical element based on the scanning angles.

Specifically, if the focal length is increased, video signal control section 9 controls actuator 84 such that the distance between ¼ wavelength plate 82 and mirror 83 becomes short. In contrast, if the focal length is decreased, video signal control section 9 controls actuator 84 such that the distance between ¼ wavelength plate 82 and mirror 83 becomes large.

The optical path length from lens 80 to lens 86 depends on the displacement of mirror 83 moved by actuator 84. If the displacement of mirror 83 is d, the change of the optical path length from lens 80 to actuator 84 becomes 4d. In this case, the displacement of actuator 84 is ¼ of the change of the optical path length.

On the other hand, as shown in FIG. 3A and FIG. 3B, in the structure (comparative example) in which condenser lens 130 and divergent lens 131 are located side by side along a straight line and in which condenser lens 130 and divergent lens 131 are moved in parallel in their optical axis directions by an actuator, the parallel movement amount of the actuator is d, whereas the change of the optical path length is d. In other words, the displacement of the actuators is the same as the change of the optical path length.

As described above, in the scanning type image display device according to this embodiment, the displacement of the actuator is ¼ of the foregoing comparative example. Thus, an actuator that is smaller and that reduced drive power consumption to levels that are lower than those in the comparative example can be used.

In addition, according to the fifth exemplary embodiment, as well as the foregoing effect, the effect of the first exemplary embodiment can be also obtained.

It should be noted that the scanning type image display device according to this embodiment is exemplary. Thus, the structure of the scanning type image display device can be appropriately modified. For example, PBSs 81 and 85 may reflect the P-polarized light and transmit the S-polarized light.

Alternatively, actuator 84 may move a section including mirror 83 and ¼ wavelength plate 82 in parallel.

Alternatively, actuator 84 may move a section including mirror 83, ¼ wavelength plate 82, and PBSs 81 and 85 in parallel.

Alternatively, a lens having a negative refractive power may be used instead of lens 86.

(Sixth Exemplary Embodiment)

A scanning type image display device according to a sixth exemplary embodiment is basically the same as that according to the first exemplary embodiment except for part of varifocal optical element 4.

Figure 11:
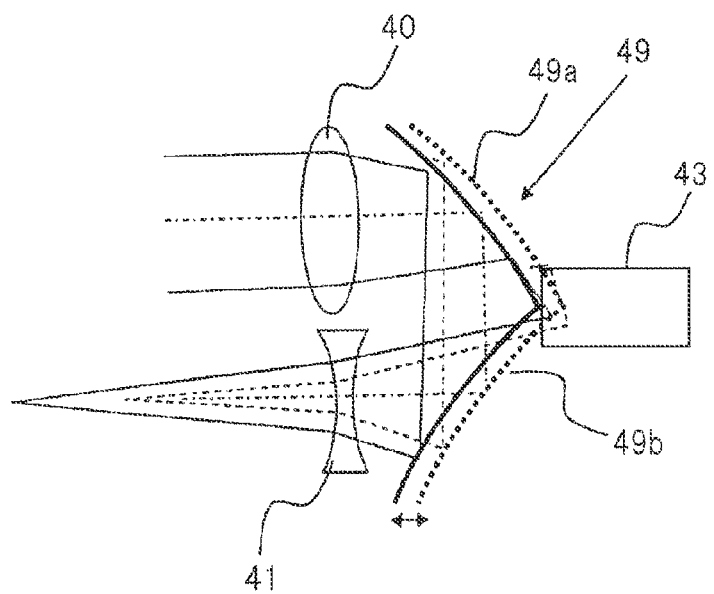
[FIG. 11] is a schematic diagram showing the structure of a varifocal optical element used for a scanning type image display device according to a sixth exemplary embodiment.

FIG. 11 shows the structure of varifocal optical element 4 used for the scanning type image display device according to the sixth exemplary embodiment.

Referring to FIG. 11, the structure of varifocal optical element 4 is the same as that shown in FIG. 5 except that orthogonal plain mirror 42 is replaced with concave-convex mirror 49.

Concave-convex mirror 49 is composed of concave mirror 49a and convex mirror 49b such that they have a L-shaped cross section. The concave surface of concave mirror 49a and the convex surface of convex mirror 49b face lenses 40 and 41, respectively.

The center ray of the laser beam that passes through lens 40 enters concave mirror 49a at an incident angle of around 45°. The center ray of the laser beam that is reflected by concave mirror 49a enters convex mirror 49b at an incident angle of around 45°. The center ray of the laser beam reflected by convex mirror 49b matches the optical axis of lens 41.

Actuator 43 moves concave-convex mirror 49 in parallel in the optical axis directions of lenses 40 and 41.

In the scanning type image display device according to this embodiment, video signal control section 9 changes the focal length of the varifocal optical element based on the scanning angles.

Specifically, if the focal length is increased, video signal control section 9 controls actuator 43 such that concave-convex mirror 49 moves in parallel to lenses 40 and 41. In contrast, if the focal length is decreased, video signal control section 9 controls actuator 43 such that concave-convex mirror 49 moves in parallel in the opposite direction of lenses 40 and 41.

The optical path length from lens 40 to lens 41 depends on the displacement of concave-convex mirror 49 moved by actuator 43.

If the displacement of concave-convex mirror 49 is d, the optical path length from lens 40 to lens 41 becomes 2d. In this case, the displacement of actuator 43 is ½ of the change of the optical path length.

On the other hand, as shown in FIG. 3A and FIG. 3B, in the structure in which condenser lens 130 and divergent lens 131 are located side by side along a straight line and condenser lens 130 and divergent lens 131 are moved in parallel in their optical axis directions by an actuator (comparative example), the parallel movement amount of the actuator is d, whereas the change of the optical path length is d. In other words, the displacement of the actuators is the same as the change of the optical path length.

As described above, in the scanning type image display device according to this embodiment, the displacement of the actuator is half of the foregoing comparative example. Thus, an actuator that is smaller and that reduced drive power consumption to levels that are lower than those in the comparative example can be used.

In addition, since concave mirror 49a operates as a lens having a positive refractive power and convex mirror 49b operates as a lens having a negative refractive power, as lenses 40 and 41, lenses having small curvatures compared with the varifocal optical element shown in FIG. 5 can be used. As the curvatures of the lenses are small, they are less affected by aberrations. Thus, since numerical aperture NA can be increased, the beam can be narrowed.

In addition, according to the sixth exemplary embodiment, as well as the foregoing effect, the effect of the first exemplary embodiment can be also obtained.

It should be noted that the scanning type image display device according to this embodiment is exemplary.

For example, in the structure shown in FIG. 11, the first surface is concave mirror 49a and the second surface is convex mirror 49b. It should be noted that other structures are possible. The shapes of the first and second surfaces may be formed in any combination.

For example, the first surface may be a plane surface and the second surface may be a convex surface or a concave surface. Alternatively, the first surface may be a convex surface and the second surface may be a plane surface or a concave surface. Alternatively, the first surface may be a concave surface and the second surface may be a plane surface or a convex surface.

Alternatively, lens 41 may be a lens having a positive refractive power.

Although embodiments of the present invention has been described with reference to the embodiments, it should be understood that the present invention is not restricted to the embodiments. For the configurations and operations of the present invention, various changes and modifications that any person skilled in the art can understand can be made without departing from the sprit of the present invention.

The invention claimed is:

1. An image display device, comprising:
   an optical element that condenses a light beam and has a variable focal length, wherein the optical element comprises
   a first lens and a second lens that have optical axes parallel to each other, wherein said first and second lenses are located side by side in a direction orthogonal to said optical axes,
   a reflector that receives said light beam through said first lens and reflects the light beam to said second lens, and
   at least one actuator that moves at least one of said reflector, said first lens, and said second lens in a direction parallel to said optical axes;
   a scanner that scans a projection surface with said light beam condensed by said optical element; and
   a controller that controls said scanner based on a video signal to display an image on said projection surface, controls said focal length of said optical element based on a scanning angle of said scanner, and controls said at least one actuator to change the focal length of said optical element.

2. The image display device as set forth in claim 1, wherein said reflector comprises:
   a first reflection surface that deflects a ray of light that is parallel to the optical axis of said first lens at an angle of 90°; and
   a second reflection surface that deflects said ray of light deflected by said first reflection surface to said second lens at an angle of 90°.

3. The image display device as set forth in claim 2,
   wherein said first reflection surface and said second reflection surface are a first plane mirror and a second plane mirror, respectively, and
   wherein said first reflection surface and said second reflection surface are orthogonal to each other.

4. The image display device as set forth in claim 2,
   wherein at least one of said first reflection surface and said second reflection surface comprises a curved surface.

5. The image display device as set forth in claim 4,
   wherein said first reflection surface comprises a concave surface, and
   wherein said second reflection surface comprises at least one of a convex surface and a plane surface.

6. The image display device as set forth in claim 4,
   wherein said first reflection surface comprises a plane surface, and wherein said second reflection surface comprises at least one of a convex surface and a concave surface.

7. The image display device as set forth in claim 4,
wherein said first reflection surface comprises a convex surface, and
wherein said second reflection surface comprises at least one of a plane surface and a concave surface.

8. The image display device as set forth in claim 2,
wherein said reflector comprises a right-angled prism having a surface that comprises said first reflection surface and said second reflection surface, and
wherein said first reflection surface and said second reflection surface form a right angle of said right-angled prism.

9. The image display device as set forth in claim 1,
wherein said reflector includes:
   a first plane mirror having a first reflection surface;
   a second plane mirror having a second reflection surface, wherein said first and second reflection surfaces are orthogonal to each other;
   a third plane mirror having a third reflection surface; and
   a fourth plane mirror having a fourth reflection surface, wherein said third and fourth reflection surfaces are orthogonal to each other,
   wherein said first plane mirror faces said third plane mirror,
   wherein said second plane mirror faces said fourth plane mirror,
wherein said at least one actuator includes:
   a first actuator that moves said first plane mirror and said second plane mirror in parallel; and
   a second actuator that moves said third plane mirror and said fourth plane mirror in parallel, and
wherein said controller controls said first actuator and said second actuator such that a direction in which said first plane mirror and said second plane mirror are moved is opposite to a direction in which said third plane mirror and said fourth plane mirror are moved.

10. The image display device as set forth in claim 1,
wherein said reflector includes:
   a first polarizing beam splitter that is located on said optical axis of said first lens and that transmits first polarized light and reflects second polarized light whose polarizing direction differs from said first polarized light;
   a second polarizing beam splitter that is located on said optical axis of said second lens and that transmits said first polarized light and reflects said second polarized light;
   a plane mirror that faces said first and second lenses,
   wherein said first polarized beam splitter is located between said first lens and said plane mirror and said second polarized beam splitter is located between said second lens and said plane mirror; and
   a ¼ wave length plate that is located between said first and second polarized beam splitters and said plane mirror, and
wherein said at least one actuator moves said plane mirror in a direction parallel to at least one of said optical axes of said first and second lenses.

11. The image display device as set forth in claim 1,
wherein said first lens has a positive refractive power, and
wherein said second lens has a negative refractive power.

* * * * *